United States Patent [19]

Badejo et al.

[11] Patent Number: 5,713,999
[45] Date of Patent: Feb. 3, 1998

[54] INCORPORATION OF PIGMENT DERIVATIVES IN QUINACRIDONE PROCESSES

[75] Inventors: Ibraheem T. Badejo, N. Charleston; Margot Campos, Charleston; Michael J. Greene, Charleston; Daphne J. Rice, Charleston, all of S.C.

[73] Assignee: Bayer Corporation, Pittsburgh, Pa.

[21] Appl. No.: 639,598

[22] Filed: Apr. 29, 1996

[51] Int. Cl.$^6$ .............................. C09B 48/00; C09B 67/52
[52] U.S. Cl. .............................. 106/495; 106/497; 546/49; 546/56
[58] Field of Search ..................... 106/495, 497; 546/49, 56

[56] References Cited

U.S. PATENT DOCUMENTS

| | | | |
|---|---|---|---|
| 3,157,659 | 11/1964 | Deuschel et al. | 546/56 |
| 3,256,285 | 6/1966 | Fuchs et al. | 546/28 |
| 3,257,405 | 6/1966 | Gerson et al. | 546/29 |
| 3,317,539 | 5/1967 | Jaffe | 546/57 |
| 4,310,359 | 1/1982 | Ehashi et al. | 106/495 |
| 4,455,173 | 6/1984 | Jaffe | 106/495 |
| 4,810,304 | 3/1989 | Jaffe et al. | 106/495 |
| 5,084,100 | 1/1992 | Bauman | 106/495 |
| 5,236,498 | 8/1993 | Zaloum et al. | 106/497 |
| 5,362,780 | 11/1994 | Bäbler et al. | 524/88 |
| 5,368,641 | 11/1994 | Dietz et al. | 106/495 |
| 5,457,203 | 10/1995 | Hendi et al. | 546/56 |
| 5,472,494 | 12/1995 | Hetzenegger et al. | 106/493 |
| 5,472,496 | 12/1995 | Hendi et al. | 106/497 |

FOREIGN PATENT DOCUMENTS 719842 7/1996 European Pat. Off. .

OTHER PUBLICATIONS

S.S. Labana and L.L. Labana "Quinacridones", Chemical Reviews, vol. 67, Jan. 25, 1967, pp. 1–18.

*Primary Examiner*—Mark L. Bell
*Assistant Examiner*—Scott L. Hertzog
*Attorney, Agent, or Firm*—Joseph C. Gil; Richard E.L. Henderson

[57] ABSTRACT

This invention relates to a process for the preparation of quinacridone pigments by (a) heating, at a temperature of about 80° C. to about 145° C., a reaction mixture containing
  (i) 2,5-dianilinoterephthalic acid, a 2,5-dianilino-3,6-dihydroterephthalic acid ester, and/or a derivative thereof,
  (ii) about 3 to about 15 parts by weight, per part of component (a)(i), of a dehydrating agent, and
  (iii) about 0.1 to about 15 percent by weight, based on component (a)(i), of one or more non-quinacridone pigments, with the proviso that if component (a)(i) is a 2,5-dianilino-3,6-dihydroterephthalic acid ester or a derivative thereof, reaction step (a) additionally comprises an oxidation step;

(b) drowning the reaction mixture from step (a) by adding said reaction mixture to about 3 to about 15 parts by weight, per part of component (a)(i), of a liquid in which the quinacridone pigment is substantially insoluble;

(c) isolating the quinacridone pigment;

(d) optionally, conditioning the quinacridone pigment; and (e) optionally, blending the resultant pigment with one or more quinacridone derivatives.

15 Claims, No Drawings

INCORPORATION OF PIGMENT DERIVATIVES IN QUINACRIDONE PROCESSES

BACKGROUND OF THE INVENTION

This invention relates to a process for the preparation of quinacridone pigments having reduced particle size, improved coloristic properties, improved rheological properties, and lower manufacturing costs. The addition of certain pigments and/or their derivatives during quinacridone synthesis provides quinacridone pigments having deeper, brighter masstones and improved transparency and rheological properties, as well as brighter, bluer metallics and bluer tints. Additionally, because a reduction in melt viscosity allows higher loadings of raw materials during ring-closure, manufacturing costs are generally lowered.

Processes for the preparation of quinacridone are known. E.g., S. S. Labana and L. L. Labana, "Quinacridones" in *Chemical Review*, 67, 1–18 (1967), and U.S. Pat. Nos. 3,157,659, 3,256,285, and 3,317,539. The quinacridones thus obtained, known as crude quinacridones, are generally unsuitable for use as pigments and must undergo one or more additional finishing steps to modify the particle size, particle shape, or crystal structure to achieve pigmentary quality.

A preferred method for preparing quinacridones involves thermally inducing ring closure of 2,5-dianilinoterephthalic acid intermediates, as well as known aniline-substituted derivatives thereof, in the presence of polyphosphoric acid. E.g., U.S. Pat. No. 3,257,405. After ring closure is complete, the melt is drowned by pouring into a liquid in which the quinacridone is substantially insoluble, usually water and/or an alcohol. The resultant crystalline pigment is then further conditioned by solvent treatment or milling in combination with solvent treatment.

It is also possible to use 2,5-dianilino-3,6-dihydroterephthalic acid esters as a starting material in the ring-closure reaction. The resultant dihydroquinacridone must, however, be oxidized to the corresponding quinacridone before isolation and conditioning.

Final particle size of quinacridone pigments can be controlled by the methods used in both synthesis and aftertreatment. For example, quinacridone pigments can be made more transparent by reducing the particle size or more opaque by increasing the particle size. In known methods, particle size is generally controlled during precipitation of the pigment by drowning or during milling or solvent treatment of the crude pigment. Tinctorial strength and transparency of pigments can also be affected by solvent treatment. Aftertreatment steps that manipulate the crude pigments particle size are often referred to as conditioning methods.

Several suitable conditioning methods are known. However, the most commonly used methods involve milling dried crude quinacridones, generally in the presence of undesirably large amounts of an inorganic salt that must subsequently be removed. Pigmentary quinacridones can also be obtained by first premilling the dried crude material and then treating the milled material with an organic liquid. Other methods involve a premilling step followed by another milling step using water and small amounts of an organic liquid. Pigmentary quinacridones can also be obtained by heat treatment of crude presscake in large quantities of solvent. Various additives have been added during the milling, solvent treatment, or post-solvent treatment steps to further improve pigment properties. For example, U.S. Pat. No. 4,455,173 discloses a process in which crude quinacridone pigments are acid pasted or ball milled and then milled in an organic liquid, preferably in the presence of a 2-phthalimidomethylquinacridone particle-size growth inhibitor. U.S. Pat. No. 5,084,100 discloses a method in which crude quinacridone is ball milled in the presence of aluminum sulfate and esters of alkane dicarboxylic acids.

The addition of certain quinacridone derivatives to the ring-closure step has also been reported. For example, U.S. Pat. No. 5,368,641 discloses the use of various quinacridone derivatives in the manufacture of 2,9-dimethylquinacridone. The present invention, in contrast, uses classes of pigments other than quinacridones as the additive. In addition, European Patent Application 643,110 (counterpart of U.S. Pat. No. 5,457,203) describes the use of quinacridone derivatives during the oxidation of dihydroquinacridone (prepared from 2,5-dianilino-3,6-dihydroterephthalic acid) to quinacridone. The present invention, in contrast, not only uses pigments other than quinacridones as additives but also uses the pigment additives in the ring-closure step.

Pigment derivatives other than those of quinacridones have been described as useful for treating various pigments, including quinacridones (e.g., U.S. Pat. Nos. 4,310,359 and 5,472,494), but such derivatives have typically been added to the fully formed quinacridone pigments. Although the physical properties of quinacridone pigments can often be improved in this way, the treatment of quinacridones with colored pigments other than quinacridones, including derivatives of such colored pigments, generally produces undesirable coloristic properties, at least in part because the quinacridone and the pigment derivatives typically have different color properties. It has now been found, however, that the addition of specified amounts of pigments other than quinacridones to the ring-closure step can provide quinacridone pigments having desirable coloristic properties not otherwise attainable, even when preparing the quinacridones in the presence of quinacridone derivatives.

The present invention provides smaller particle size quinacridones having improved rheological properties and transparency by the addition of certain pigments and/or their derivatives to the ring-closure step of the quinacridone synthesis. In addition, because the presence of the non-quinacridone pigment during ring closure (preferably in polyphosphoric acid) reduces the viscosity of the reaction melt, it is possible to increase raw material loadings without adverse side effects, thereby reducing manufacturing costs. The addition of a non-quinacridone pigment during quinacridone synthesis (i.e., ring-closure) before precipitation results in a deeper, brighter pigment having improved transparency and rheological properties, as well as brighter, bluer metallics and bluer tints. The process of the present invention is in principle applicable to all quinacridone pigment manufacturing processes that include an "acid pasting" step, but the greatest improvement in coloristic properties is expected for ring-closure processes, including processes used to prepare quinacridone solid solutions.

SUMMARY OF THE INVENTION

This invention relates to a process for the preparation of quinacridone pigments comprising
(a) heating, at a temperature of about 80° C. to about 145° C. (preferably 100° C. to 130° C.) (preferably for about one to about 24 hours), a reaction mixture comprising
  (i) 2,5-dianilinoterephthalic acid, a 2,5-dianilino-3,6-dihydroterephthalic acid ester, a derivative of 2,5- dianilinoterephthalic acid or a 2,5-dianilino-3,6-dihydroterephthalic acid ester having one or more substituents in at least one aniline ring, or a mixture thereof, (ii) about 3 to about 15 parts by weight (preferably 3 to 10 parts by weight), per part of component (a)(i), of a dehydrating agent (preferably polyphosphoric acid), and (iii) about 0.1 to about 15 percent by weight (preferably 0.1 to 10 percent by weight, more preferably 0.1 to 5 percent by weight), based on component (a)(i), of one or more non-quinacridone pigments (preferably a copper phthalocyanine, perylene, or dioxazine), with the proviso that if component (a)(i) is a 2,5-dianilino-3,6-dihydroterephthalic acid ester or a derivative thereof, reaction step (a) additionally comprises an oxidation step (which converts the initially formed dihydroquinacridone intermediate to the corresponding quinacridone);

(b) drowning the reaction mixture from step (a) by adding said reaction mixture to about 3 to about 15 parts by weight (preferably 5 to 10 parts by weight), per part of component (a)(i), of a liquid in which the quinacridone pigment is substantially insoluble;

(c) isolating the quinacridone pigment;

(d) optionally, conditioning the quinacridone pigment; and (e) optionally, blending (preferably dry blending) the resultant quinacridone pigment with one or more quinacridone derivatives.

DETAILED DESCRIPTION OF THE INVENTION

Quinacridone pigments (by which is meant unsubstituted quinacridone, quinacridone derivatives, and solid solutions thereof) are prepared according to the invention by first ring-closing 2,5-dianilinoterephthalic acid intermediates, including known aniline-substituted derivatives thereof, by heating such terephthalic acid intermediates in the presence of a dehydrating agent (preferably polyphosphoric acid) and a non-quinacridone pigment according to the invention or, less preferably, by thermally inducing ring closure in a high-boiling solvent in the presence of a non-quinacridone pigment according to the invention. The quinacridone is then drowned and isolated by known methods. The quinacridone pigment is preferably also subjected to additional conditioning steps to improve pigmentary properties and, if desired, blended with an additional quinacridone derivative.

The process of the invention can be used to prepare unsubstituted quinacridone or ring-substituted quinacridone derivatives, depending on whether the ring closure is carried out using 2,5-dianilinoterephthalic acid or derivatives thereof having one or more substituents in at least one of the two aniline rings. Although essentially any 2,5-dianilinoterephthalic acid derivatives known in the art can be used, particularly preferred 2,5-dianilinoterephthalic acid derivatives are those in which both aniline moieties are substituted (typically with the same substituent) in the para position with groups such as halogen (preferably chlorine), $C_1$–$C_6$ alkyl (preferably methyl), and $C_1$–$C_6$ alkoxy (preferably methoxy). It is also possible to use 2,5-dianilinoterephthalic acid derivatives in which both aniline moieties are substituted in the ortho or meta positions. Examples of suitable 2,5-dianilinoterephthalic acid derivatives include 2,5-di(4-chloroanilino)terephthalic acid, 2,5-di(4-methylanilino)terephthalic acid, 2,5-di(4-methoxyanilino)terephthalic acid.

It is also possible to use mixtures containing 2,5-dianilinoterephthalic acid and one or more derivatives thereof or mixtures containing two or more 2,5-dianilinoterephthalic acid derivatives. The use of such mixtures provides a particularly advantageous method for obtaining quinacridone solid solutions. Mixtures containing 2,5-dianilinoterephthalic acid and/or a derivative thereof in combination with a fully formed quinacridone pigment (generally in crude form) can also often be used.

Ring-closure step (a) is carried out in a dehydrating agent, particularly a strong acid such as polyphosphoric acid, acidic esters of polyphosphoric acid, or sulfuric acid. E.g., U.S. Pat. No. 4,758,665; and S. S. Labana and L. L. Labana, "Quinacridones" in *Chemical Reviews*, 67, 1–8 (1967). Polyphosphoric acid having a phosphate content equivalent to about 110–120% $H_3PO_4$ is particularly preferred. When using polyphosphoric acid, the weight ratio of polyphosphoric acid to the terephthalic acid intermediate is typically about 3:1 to about 10:1 (preferably 4:1 to 8:1). The lower ratios can give high viscosity reaction masses. However, because the presence of pigment derivatives during ring closure tends to give lower melt viscosities, the lower ratios are generally effective. Moreover, even when viscosities are relatively high, the lower ratios are generally preferred because of cost considerations.

It is sometimes preferable to use a 2,5-dianilino-3,6-dihydroterephthalic acid ester (preferably a $C_1$–$C_6$ alkyl ester) or a derivative thereof as a starting material in the ring-closure reaction, after which the resultant dihydroquinacridone must be oxidized and collected. The present invention is also applicable to this variant of quinacridone synthesis. It is, of course, possible to use mixtures of 2,5-dianilino-3,6-dihydroterephthalic acid ester and/or derivatives thereof to obtain quinacridone solid solutions.

A critical feature of the invention is the presence of a pigment other than a quinacridone (that is, a "non-quinacridone pigment"), preferably a copper phthalocyanine, perylene, or dioxazine, during the ring-closure reaction. As used herein, the term "non-quinacridone pigment" refers both to unsubstituted pigments other than quinacridones and to substituted derivatives thereof. Suitable non-quinacridone pigments, although they are typically highly colored, do not necessarily need to exhibit good pigmentary properties. That is, suitable non-quinacridone pigments would not themselves necessarily have practical utility as pigments. For example, a relatively weak pigment or pigment derivative might still be suitable for use according to the invention. A crude pigment not having good pigmentary properties only because it has not yet been conditioned might also be suitable for use according to the invention. (Conditioned non-quinacridone pigments can, of course, also be used.) Particularly preferred non-quinacridone pigments will exhibit molar absorptivities of approximately the same order of magnitude as those of the quinacridone pigments with which they are used.

Suitable non-quinacridone pigments include compounds having the following formula (I)

$$Q(A—Y)_n \qquad (I)$$

in which Q represents a non-quinacridone pigment moiety; A represents —O—, —S—, —NR$^a$— (in which R$^a$ is hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl), —SO$_2$—, —CO—, —Alk— (in which —Alk— is $C_1$–$C_8$ alkylene, substituted $C_1$–$C_8$ alkylene, $C_5$–$C_7$ cycloalkylene, or substituted $C_5$–$C_7$ cycloalkylene), or —Ar— (in which —Ar— is $C_6$–$C_{10}$ arylene or substituted $C_6$–$C_{10}$ arylene) bridging groups, chemically reasonable combinations of such bridging groups, or a direct bond between Q and Y (preferably —$SO_2$—NH—Alk—, —CO—NH—Alk—, or direct bonds); Y represents hydrogen, $C_1$–$C_{12}$ alkyl, $C_2$–$C_{12}$ alkenyl, $C_5$–$C_7$ cycloalkyl, $C_5$–$C_7$ cycloalkenyl, $C_6$–$C_{10}$ aryl, heteroaryl having five or six ring atoms (in which at least one such ring atom is N, O, S, or a combination thereof, and which are optionally fused to one or more additional aromatic rings), $C_7$–$C_{16}$ aralkyl, $OR^b$ (in which $R^b$ is hydrogen, metal, or $C_1$–$C_{12}$ alkyl), —$NR^cR^d$ (in which $R^c$ and $R^d$ are independently hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl, or $R^c$ and $R^d$ together are $C_4$–$C_6$ alkylene forming a heterocyclic group or are aliphatic or aromatic dicarbonyl groups forming an imide, and wherein $R^c$ and $R^d$ optionally can further contain heteroatoms such as N, O, or S and optionally can further be substituted with $C_1$–$C_{12}$ alkyl, $C_1$–$C_{12}$ alkoxy, $C_2$–$C_{12}$ alkenyl, $C_5$–$C_7$ cycloalkyl, $C_5$–$C_7$ cycloalkenyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, —OH, halogen, —CN, carboxyl, —CO—$NR^cR^d$, or —$SO_2$—$NR^cR^d$), or halogen; and n is from about 0.01 to about 4. Fractional values for n indicate that the pigment derivatives can be used as mixtures of compounds having various degrees of substitution, including the same unsubstituted pigment (i.e., QH). When more than one group —A—Y is present, the various A and Y groups can, of course, be the same or different from one another. The pigment moiety Q can be derived from essentially any class of organic pigments other than quinacridone, including phthalocyanines, dioxazines (that is, triphenedioxazines), perylenes (particularly the diimides and dianhydrides of perylene-3,4,9,10-tetracarboxylic acid), 1,4-diketopyrrolopyrroles, anthrapyrimidines, anthanthrones, flavanthrones, indanthrones, isoindolines, isoindolinones, perinones, pyranthrones, thioindigos, 4,4'-diamino-1,1'-dianthraquinonyl, or azo compounds. Preferred non-quinacridone pigments are phthalocyanines, perylenes, and dioxazines. The non-quinacridone pigment moiety itself can contain one or more substituents other than the —A—Y groups, including, for example, halogen (preferably chlorine), $C_1$–$C_6$ alkyl (preferably methyl), and $C_1$–$C_6$ alkoxy (preferably methoxy). Particularly preferred non-quinacridone pigments, however, are copper phthalocyanines or perylenes having one or more —A—Y groups but not other substituents and dioxazines in which other substituents can be present. Such pigment derivatives are disclosed, for example, in U.S. Pat. No. 4,310,359 and British Patent 784,843.

As used herein, the term "$C_1$–$C_{12}$ alkyl" refers to straight or branched chain aliphatic hydrocarbon groups having from 1 to 12 carbon atoms. Examples of $C_1$–$C_{12}$ alkyl are methyl, ethyl, propyl, butyl, pentyl, hexyl, heptyl, octyl, nonyl, decyl, undecyl, dodecyl, and the isomeric forms thereof. The term "$C_1$–$C_{12}$ alkoxy" refers to straight or branched chain alkyl oxy groups having from 1 to 12 carbon atoms. Examples of $C_1$–$C_{12}$ alkoxy are methoxy, ethoxy, propoxy, butoxy, pentyloxy, hexyloxy, heptyloxy, octyloxy, nonyloxy, decyloxy, undecyloxy, dodecyloxy, and the isomeric forms thereof. The term "$C_2$–$C_{12}$ alkenyl" refers to straight or branched chain unsaturated aliphatic hydrocarbon groups having from 2 to 12 carbon atoms and one carbon-carbon double bond. Examples of $C_2$–$C_{12}$ alkenyl are ethenyl, propenyl, butenyl, pentenyl, hexenyl, heptenyl, octenyl, nonenyl, decenyl, undecenyl, dodecenyl, and the isomeric forms thereof. The term "$C_5$–$C_7$ cycloalkyl" refers to cycloaliphatic hydrocarbons groups having from 5 to 7 carbon atoms. Examples of $C_5$–$C_7$ cycloalkyl are cyclopentyl, cyclohexyl, and cycloheptyl. The term "$C_5$–$C_7$ cycloalkoxy" refers to cycloalkyl oxy groups having from 5 to 7 carbon atoms. Examples of $C_5$–$C_7$ cycloalkoxy are cyclopentyloxy, cyclohexyloxy, and cycloheptyloxy. The term "$C_5$–$C_7$ cycloalkenyl" refers to cycloaliphatic hydrocarbons groups having from 5 to 7 carbon atoms and one carbon-carbon double bond. Examples of $C_5$–$C_7$ cycloalkenyl are cyclopentenyl, cyclohexenyl, and cycloheptenyl. The term "$C_6$–$C_{10}$ aryl" refers to phenyl and 1- or 2-naphthyl, as well as to phenyl and naphthyl groups substituted with alkyl, alkoxy, halogen, cyano, an nitro as defined herein. The term "$C_6$–$C_{10}$ aryloxy" refers to phenoxy and 1- or 2-naphthoxy, in which the aryl portion can optionally be substituted as described above for "aryl." The term "heteroaryl" refers to five- and six-membered aromatic groups in which at least one ring atom is N, O, S, or a combination thereof, and which can optionally be fused to one or more additional aromatic rings. Such heteroaryl groups are attached to group A at a ring carbon atom or, where chemically reasonable, at a ring nitrogen atom. Examples of heteroaryl are pyrrolyl, imidazolyl, pyrazolyl, furanyl, thiophenyl, isothiazolyl, pyridinyl, pyrazinyl, pyrimidinyl, pyridazinyl, and the like. The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. The term "$C_7$–$C_{16}$ aralkoxy" refers to $C_1$–$C_6$ alkoxy substituted with $C_6$–$C_{10}$ aryl such that the total number of carbon atoms is from 7 to 16. An example of $C_7$–$C_{16}$ aralkoxy is benzyloxy. The term "$C_1$–$C_8$ alkylene" refers to straight or branched chain difunctional aliphatic hydrocarbon groups having from 1 to 8 carbon atoms. Examples of $C_1$–$C_8$ alkylene are methylene, ethylene, propylene, butylene, pentylene, hexylene, heptylene, and octylene, as well as the isomeric branched forms thereof. The related term "$C_4$–$C_6$ alkylene" refers to straight or branched chain difunctional aliphatic hydrocarbon groups having from 4 to 6 carbon atoms and bonded to the amide nitrogen atom through two different carbon atoms so as to form a heterocyclic ring. Examples of $C_4$–$C_6$ alkylene are butylene (forming a pyrrolidino substituent), optionally substituted with a methyl group; and pentylene (forming a piperidino substituent). The term "$C_5$–$C_7$ cycloalkylene" refers to difunctional cycloaliphatic hydrocarbon groups having from 5 to 7 carbon atoms. Examples of $C_5$–$C_7$ cycloalkylene are cyclopentylene, cyclohexylene, and cycloheptylene. The term "$C_6$–$C_{10}$ arylene" refers to phenylene and disubstituted naphthalene, in which the aryl portion can optionally be substituted as described above for "aryl". Examples of halogen are fluorine, chlorine, bromine, and iodine.

Suitable pigment derivatives are pigment sulfonic acids having the following formula (II)

$$Q(SO_2—OR^b)_n \qquad (II)$$

in which Q represents a non-quinacridone pigment moiety; $R^b$ is hydrogen or a metal; and n is from about 0.01 to about 4. As with general formula (I), fractional values for n indicate that the derivatives can be used as mixtures, including mixtures containing the unsubstituted pigment. Suitable metals include alkali metals (such as lithium, sodium, and potassium), alkaline earth metals (such as magnesium, calcium, and barium), aluminum, transition metals and other heavy metals (such as nickel, iron, cobalt, manganese, copper, and tin). The non-quinacridone pigment moiety Q present in the sulfonic acids and salts of formula (II) can be the same as described above for the compounds of formula (I). Preferred sulfonic acid pigment derivatives are copper phthalocyanines having about 0.2 to about 2 sulfonic acid groups, most preferably derivatives in which the phthalocyanine ring is otherwise unsubstituted.

Particularly preferred pigment derivatives include pigment sulfonamides having the following formula (III)

in which Q represents a non-quinacridone pigment moiety; Alk represents $C_1$–$C_8$ alkylene or $C_5$–$C_7$ cycloalkylene; $R^c$ and $R^d$ are independently hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl, or $R^c$ and $R^d$ together are $C_4$–$C_6$ alkylene forming a heterocyclic group; and n is from about 0.01 to about 4. $R^c$ and $R^d$ can also contain heteroatoms such as N, O, or S. As with general formula (I), fractional values for n indicate that the derivatives can be used as mixtures, including mixtures containing the unsubstituted pigment. The non-quinacridone pigment moiety Q present in the sulfonamides of formula (III) can be the same as described above for the compounds of formula (I). Preferred sulfonamide pigment derivatives are copper phthalocyanines having about 0.2 to about 2 sulfonamide groups, most preferably derivatives in which the phthalocyanine ring is otherwise unsubstituted.

The non-quinacridone pigments of the invention can be added at any point during or before ring-closure step (a). For example, the non-quinacridone pigments can be added during the preparation of the 2,5-dianilinoterephthalic acid intermediates as long as the non-quinacridone pigments are stable to the reaction conditions.

The reaction mixture of step (a) is heated at a temperature of about 80° C. to about 145° C. (preferably 100° C. to 130° C.), preferably for about 1 to about 24 hours (more preferably for 1 to 12 hours).

After ring-closure step (a) is completed, the quinacridone pigment is precipitated (i.e., "drowned") in step (b) by adding the strongly acidic melt to a liquid in which the quinacridone pigment is substantially insoluble, preferably water, a water-miscible solvent (such as methanol, or other lower aliphatic alcohols), or mixtures thereof. Although it is possible to add the drowning liquid to the acidic melt (e.g., U.S. Pat. No. 3,265,699), the present invention is preferably carried out by adding the acidic melt to the solvent (compare U.S. Pat. No. 4,100,162).

Suitable drowning liquids include water and/or water-miscible organic liquids; including, for example, lower aliphatic alcohols, such as methanol; ketones and ketoalcohols, such as acetone, methyl ethyl ketone, and diacetone alcohol; amides, such as dimethylformamide and dimethyl-acetamide; ethers, such as tetrahydrofuran and dioxane; alkylene glycols and triols, such as ethylene glycol and glycerol; and other such organic liquids known in the art. Other organic liquids can be used but are generally less preferred.

The temperature of the drowning liquid is usually between about 5° C. and about 65° C. In general, lower drown temperatures give pigments having smaller particle sizes. However, because process cycle time is also very important (because of manufacturing cost), a shorter drowning time is preferred. The presence of pigment derivative (a)(iii), which acts in part as a particle growth inhibitor, allows the solvent temperature to rise during the drowning process, thus shortening the time without excessive particle size growth.

It is possible but less preferred to include a portion of the pigment derivative in the drown step.

The drowned pigment is then isolated in step (c) using methods known in the art, such as filtration, and then dried if desired. Other collection methods known in the art, such as centrifugation, microfiltration, or even simple decantation, are also suitable.

The crystalline pigment obtained in step (c) can be conditioned in an optional step (d) using methods known in the art, such as solvent treatment or milling in combination with solvent treatment. Final particle size of the pigment can be controlled by varying the method of aftertreatment. For example, pigments can be made more transparent by reducing the particle size or more opaque by increasing the particle size. Suitable milling methods include dry-milling methods such as sand-milling, ball-milling, and the like, with or without additives, or wet-milling methods such as salt-kneading, bead-milling, and the like in water or organic solvents, with or without additives. It is possible, although generally less preferred, to include a portion of the non-quinacridone pigment (preferably less than about 50% of the total amount of non-quinacridone pigment) in conditioning step (d).

Tinctorial strength and transparency of the pigment can also be affected by solvent treatment carried out by heating a dispersion of the pigment, often in the presence of additives, in a suitable solvent. Suitable solvents include organic solvents, such as alcohols, esters, ketones, and aliphatic and aromatic hydrocarbons and derivatives thereof, and inorganic solvents, such as water. Suitable additives include compositions that lessen or avoid flocculation, increase pigment dispersion stability, and reduce coating viscosity, such as polymeric dispersants (or surfactants). E.g., U.S. Pat. Nos. 4,455,173; 4,758,665; 4,844,742; 4,895,948; and, 4,895,949.

During or after the conditioning step it is often desirable to use various other optional ingredients that provide improved properties. Examples of such optional ingredients include fatty acids having at least 12 carbon atoms, such as stearic acid or behenic acid, or corresponding amides, esters, or salts, such as magnesium stearate, zinc stearate, aluminum stearate, or magnesium behenate; quaternary ammonium compounds, such as tri[($C_1$–$C_4$ alkyl)benzyl] ammonium salts; plasticizers, such as epoxidized soya bean oil; waxes, such as polyethylene wax; resin acids, such as abietic acid, rosin soap, hydrogenated or dimerized rosin; $C_{12}$–$C_{18}$-paraffin-disulfonic acids; alkylphenols; alcohols, such as stearyl alcohol; amines, such as laurylamine or stearylamine; and aliphatic 1,2-diols, such as dodecane-1,2-diol. Such additives can be incorporated in amounts ranging from about 0.05 to 20% by weight (preferably 1 to 10% by weight), based on the amount of pigment.

After the pigment has been isolated and optionally conditioned, the pigment can be blended (preferably by dry blending) with one or more quinacridone derivatives known in the art. Suitable quinacridone derivatives for step (e) include quinacridone sulfonic acids and sulfonamides analogous to compounds of formulas (I), (II), and (III) above except that Q represents a quinacridone moiety.

Compared to previously known processes, pigments prepared according to the invention characteristically exhibit deeper (darker), brighter masstones, with improved transparency along with brighter, bluer metallics, and bluer tints, and sometimes exhibit improved rheological properties, all of which are highly desirable characteristics of quinacridone pigments, especially when used for automotive applications.

Because of their light stability and migration properties, the quinacridone pigments prepared according to the present invention are suitable for many different pigment applications. For example, pigments prepared according to the invention can be used as the colorant (or as one of two or more colorants) for very fast pigmented systems, such as mixtures with other materials, pigment formulations, paints, printing ink, colored paper, or colored macromolecular materials. The term "mixture with other materials" can be understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and if appropriate, preservatives. Examples of paints in which pigments of this invention can be used include, for example, physically or oxidatively drying lacquers, storing enamels, reactive paints, two-component paints, solvent- or water-based paints, emulsion paints for weatherproof coatings, and distempers. Printing inks include those known for use in paper, textile, and tinplate printing. Macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides: polymers and copolymers of acrylates, methacrylates, acrylonitrile, acrylamide, butadiene, or styrene; polyurethanes; and polycarbonates. The materials pigmented with the quinacridone pigments of the present invention can have any desired shape or form.

Pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastics materials).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Pigments prepared according to the Examples were analyzed by transmission electron microscopy using a Zeiss EM 109 instrument. Data were collected under the following conditions:
Acceleration voltage: 80 kV
Magnification: 100,000×, 40,000×, and 1,000×

Particle size data were obtained by the BET method (i.e., the method of St. Brunauer, P. H. Emmett, and E. Teller, *J. Amer. Chem. Soc.*, 60, 309 (1938)).

X-ray diffraction patterns for pigments prepared according to the invention were obtained using a Siemens D-5000 Spectrometer. Data were collected under the following conditions:
Power: 50 kV at 40 mA
Slits: 1.0 mm divergence, 1.0 mm antiscatter, 0.1 mm detector
Step size: 0.01°
Step time: 3 seconds Differences in hue and chroma were measured using an Applied Color System Spectral Sensor (Hunt Associated Laboratories, Fairfax, Va.).

Solvent-based Paint Tests

Solvent-based paint tests were carried out using a generic alkyd melamine paint system. Pigment dispersions were prepared using a mixture of 33% AROPLAZ® 1453-X-50 alkyd resin (Reichhold Chemicals, Inc.), 63% xylene, and 4% pigment, which gave a pigment-to-binder ratio of 4:33 and a total solids content of 37%. The pigment-to-binder ratio was reduced 1:10 by addition of 2.3% AROPLAZ® 1453-X-50 alkyd resin and 6.5% RESIMENE® 717 melamine resin (Monsanto Company), which gave a total solids content of 40%. Masstone and transparency measurements were made using films applied at 152 μm and 38 μm wet film thickness, respectively, and flashed at room temperature for 30 minutes and at 121° C. for 30 minutes.

Undertone tint paints were prepared from the dispersion described above having a pigment-to-binder ratio of 4:33 by adding 31% of a dispersion prepared from 30% AROPLAZ® 1453-X-50 alkyd resin, 20% xylene, 5% NUOSPERSE® 657 (Hüls America), and 50% TI-PURE® R-960 $TiO_2$ pigment (DuPont); 21% AROPLAZ® 1453-X-50 alkyd resin; and 7% RESIMENE® 717 melamine resin, which gave a pigment-to-binder ratio of 1:2, a total solids content of 50%, and a $TiO_2$-to-pigment ratio of 90:10. Color measurements were made using films applied at 76 μm wet film thickness and flashed at room temperature for 30 minutes and at 121° C. for 30 minutes.

Metallic paints were prepared from the dispersion described above having a pigment-to-binder ratio of 4:33 using an aluminum paste (available as 5251 AR from Silberline Manufacturing Co., Inc.), AROPLAZ® 1453-X-50 alkyd resin, and RESIMENE® 717 melamine resin in quantities that provided a pigment-to-binder ratio of 1:9, an aluminum-to-pigment ratio of 20:80, and a total solids content of 41%. Color measurements were made using films applied at 76 μm wet film thickness and flashed at room temperature for 30 minutes and at 121° C. for 30 minutes.

Water-based Paint Tests

Water-based paints tests were carried out using a waterborne base coat/solvent-borne clear coat system. Aqueous dispersions were prepared using a mixture of 12.4% AROLON® 559-G4-70 acrylic resin (Reichhold Chemicals, Inc.), 3.2% SOLSPERSE® 27000 hyperdispersant (Zeneca, Inc.), 1.6% 2-amino-2-methyl-1-propanol (Angus Chemical), and 18% pigment, which gave a pigment-to-binder ratio of 18:12 and a total solids content of 30%. The pigment-to-binder ratio was then reduced to 10:40 with additional AROLON® 559-G4-70 acrylic resin (total amount 26%) and 25% CYMEL® 325 melamine/formaldehyde resin (Cytec Industries), which gave a total solids content of 50%. Masstone and transparency measurements were made using films applied at 76 μm and 38 μm wet film thickness, respectively, and allowed to stand at room temperature for fifteen minutes and at 100° C. for five minutes. Clear coats containing a mixture of 80% of AROPLAZ® 1453-X-50 alkyd resin and 20% CYMEL® 325 melamine/formaldehyde resin at a total solids level of 57% were then applied over the base coat at a 76 μm wet film thickness allowed to stand at room temperature for fifteen minutes and at 121° C. for fifteen minutes.

Undertone tint paints were prepared from the reduced aqueous dispersions described above having a pigment-to-binder ratio of 10:40 by adding additional AROLON® 559-G4-70 acrylic resin, CYMEL® 325 melamine/formaldehyde resin, and 35% TINT-AYD® CW-5003 white dispersion (Daniel Products Company), which gave a pigment-to-binder ratio of 1:1.1, a total solids content of 55%, and a TiO₂-to-pigment ratio of 90:10. Color measurements were made using films applied at 38 μm wet film thickness and allowed to stand at room temperature for fifteen minutes and at 100° C. for five minutes. Clear coats were then applied and baked as described above.

Metallic paints were prepared from the dispersion described above having a pigment-to-binder ratio of 18:12 using a water-dispersible aluminum pigment (available as HYDRO PASTE® 8726 from Silberline Manufacturing Co., Inc.), AROLON® 559-G4-70 acrylic resin, and CYMEL® 325 melamine/formaldehyde resin in quantities that provided a pigment-to-binder ratio of 1:2, an aluminum-to-pigment ratio of 20:80, and a total solids content of 43%. Color measurements were made using films applied at 38 μm wet film thickness and baked as described above. Clear coats were then applied and baked as described above.

Example 1

Pigmentary quinacridone was prepared according to the invention with the incorporation of about 1% by weight, relative to the quinacridone, of N-[3-(N,N-dimethylaminopropyl)] copper phthalocyanine sulfonamide in the ring-closure reaction. The resultant quinacridone pigment was used to prepare a solvent-based paint.

To 250 g of polyphosphoric acid (117% phosphoric acid) heated at 90° C. was added 0.8 g of N-[3-(N,N-dimethylaminopropyl)] copper phthalocyanine sulfonamide followed by 83.3 g of 2,5-dianilinoterephthalic acid. The mixture was heated at 120°–125° C. for two hours. After the melt was cooled to 90°–95° C., the acid strength was adjusted to 107% by the dropwise addition of phosphoric acid. The resultant melt was stirred for 15 minutes and then slowly poured into 400 g of methanol at 24° C. During the drown, the temperature was allowed to increase to 55° C., with the temperature being controlled by external cooling and adjustment of melt addition rate. The slurry was heated at reflux (68°–72° C.) for one hour, diluted with water, and stirred at 60° C. for 30 minutes. The solid component was collected by filtration and washed with water until acid free. The resultant presscake was reslurried in water. After adjustment of the pH to greater than 7, 7.5 g of 50% sodium hydroxide was added and the resultant slurry was heated at 83° C. for one hour. The slurry was cooled, filtered, and washed with water until alkali free, then reslurried in water. After adjustment of the pH to 9.0–9.5, 2.0 g of a cycloaliphatic carboxylic acid was added. The resultant slurry was heated at about 140°–145° C. for two hours in a closed system (e.g., a pressure reactor), cooled, acidified with phosphoric acid, and stirred. The solid component was collected by filtration and washed with water. The wet cake can be dried or used as is for specific applications. Here, the wet cake was dried in an oven at 60° C. to give approximately 65.0 g of quinacridone as a brilliant violet pigment.

An alkyd melamine enamel paint prepared as described above exhibited deeper masstone, bluer tint, and increased metallic blueness compared to a paint prepared using QUINDO® Violet RV-6911 (available from Bayer Corporation).

Example 2

Pigmentary quinacridone was prepared according to the invention with the incorporation of about 1% by weight, relative to the quinacridone, of N-[3-(N,N-dimethylaminopropyl)] copper phthalocyanine sulfonamide in the ring-closure reaction. The resultant quinacridone pigment was used to prepare a water-based paint.

To 300 g of polyphosphoric acid (117% phosphoric acid) heated at 90° C. was added 0.68 g of N-[3-(N,N-dimethylaminopropyl)] copper phthalocyanine sulfonamide followed by 68.2 g of 2,5-dianilinoterephthalic acid. The mixture was heated at 120°–125° C. for two hours. After the melt was cooled to 90°–95° C., the acid strength was adjusted to 112% by the dropwise addition of phosphoric acid. The resultant melt was stirred for 15 minutes and then slowly poured into 453 g of methanol at 24° C. During the drown, the temperature was allowed to increase to 55° C., with the temperature being controlled by external cooling and adjustment of melt addition rate. The slurry was heated at reflux (68°–72° C.) for one hour, diluted with water, and stirred at 60° C. for 30 minutes. The solid component was collected by filtration and washed with water until acid free. The resultant presscake was reslurried in water. After adjustment of the pH to greater than 7, 7.5 g of 50% sodium hydroxide was added and the resultant slurry was heated at 90° C. for one hour. The slurry was cooled, filtered, and washed with water until alkali free, then reslurried in water. After adjustment of the pH to 9.0–9.5, 3.2 g of a cycloaliphatic carboxylic acid dissolved in alkaline water was added. The resultant slurry was heated at about 140°–145° C. for two hours in a closed system, cooled, acidified with phosphoric acid, and stirred. The solid component was collected by filtration and washed with water. The wet cake can be dried or used as is for specific applications. Here, the wet cake was dried in an oven at 60° C. to give approximately 53.0 g of quinacridone as a brilliant violet pigment.

An alkyd melamine enamel paint prepared as described above exhibited a much deeper and brighter masstone, bluer tint, and increased metallic blueness and brightness compared to a paint prepared using QUINDO® Violet RV-6911.

A water-based paint prepared as described above exhibited deeper masstone, increased tint blueness and chroma, and increased metallic brightness and blueness compared to a paint prepared using QUINDO® Violet RV-6911.

Example 3

Pigmentary quinacridone was prepared according to the invention with the incorporation of about 2% by weight, relative to the quinacridone, of N-[3-(N,N-dimethylaminopropyl)] copper phthalocyanine sulfonamide in the ring-closure reaction.

To 250 g of polyphosphoric acid (117% phosphoric acid) heated to 80°–85° C. was added 1.6 g N-[3-(N,N-dimethylaminopropyl)] copper phthalocyanine sulfonamide. The mixture was stirred for about ten minutes, after which was added 83.3 g of 2,5-dianilinoterephthalic acid at 85°–120° C. The reaction mixture was then heated at 120°–125° C. for three hours. After the melt was cooled to 95° C., the acid strength was adjusted to 112% by the dropwise addition of phosphoric acid. The resultant melt was stirred for 30 minutes and then slowly poured into 400 g of methanol at 24° C. During the drown, the temperature was allowed to increase to 55° C., with the temperature being controlled by external cooling and adjustment of melt addition rate. The slurry was heated at reflux for one hour, diluted with water, and stirred at 60° C. for 30 minutes. The solid component was collected by filtration and washed with water until acid free. The resultant presscake was reslurried in water. After adjustment of the pH to greater than 7, 7.5 g of 50% sodium hydroxide was added and the resultant slurry was heated at 90° C. for one hour. The slurry was cooled, filtered, and washed with water until alkali free, then reslurried in water. After adjustment of the pH to 9.0–9.5, 3.2 g of a cycloaliphatic carboxylic acid was added. The resultant slurry was heated at about 140°–145° C. for two hours in a closed system, cooled, acidified with phosphoric acid, and stirred at 70° C. for one hour. The solid component was collected by filtration and washed with water. The wet cake can be dried or used as is for specific applications. Here, the wet cake was dried in an oven at 60° C. to give approximately 61 g of quinacridone as a violet pigment.

An alkyd melamine enamel paint prepared as described above exhibited a deeper masstone and bluer tint compared to a paint prepared using QUINDO® Violet RV-6911.

Example 4 (Comparison)

Quinacridone was prepared in the absence of a pigment additive of the invention.

To 300 g of polyphosphoric acid (117% phosphoric acid) heated to 80° C. was added 68.2 g of 2,5-dianilinoterephthalic acid. The reaction mixture was heated at 120°–125° C. for two hours. After the melt was cooled to 90°–95° C., the acid strength was adjusted to 112% by the dropwise addition of phosphoric acid. The resultant melt was stirred for 20 minutes and then slowly poured into 453 g of methanol at 24° C. During the drown, the temperature was allowed to increase to 55° C., with the temperature being controlled by external cooling and adjustment of melt addition rate. The slurry was heated at reflux (68°–72° C.) for one hour, diluted with water, and stirred at 60° C. for 30 minutes. The solid component was collected by filtration and washed with water until acid free. The resultant presscake was reslurried in water. After adjustment of the pH to about 7, 7.5 g of 50% sodium hydroxide was added and the resultant slurry was heated at 90°–95° C. for one hour. The slurry was cooled, filtered, and washed with water until alkali free, then reslurried in water (595 g total, including water from the presscake). After adjustment of the pH to 9.0–9.5, 3.2 g of a cycloaliphatic carboxylic acid was added. The resultant slurry was heated at about 140°–145° C. for two hours in a closed system, cooled, acidified with phosphoric acid, and stirred. The solid component was collected by filtration and washed with water. The wet cake can be dried or used as is for specific applications. Here, the wet cake was dried in an oven at 60° C. to give approximately 53 g of quinacridone as a violet pigment.

An alkyd melamine enamel paint prepared as described above exhibited a very light masstone and a very yellow tint and metallic paint compared to a paint prepared using QUINDO® Violet RV-6911.

A water-based paint prepared as described above exhibited very light, opaque masstone and a yellow tint and metallic paint compared to a paint prepared using QUINDO® Violet RV-6911.

Example 5 (Comparison)

Quinacridone was prepared according to the method described in Example 4 (i.e., in the absence of a pigment additive of the invention) and then dry mixed with N-[3-(N,N-dimethylaminopropyl)] copper phthalocyanine sulfonamide.

To 300 g of polyphosphoric acid (117% phosphoric acid) heated to 90° C. was added 68.2 g of 2,5-dianilinoterephthalic acid. The reaction mixture was heated at 120°–125° C. for two hours. After the melt was cooled to 95° C., the acid strength was adjusted to 112% by the dropwise addition of phosphoric acid. The resultant melt was stirred for 15 minutes and then slowly poured into 453 g of methanol at 24° C. During the drown, the temperature was allowed to increase to 55° C., with the temperature being controlled by external cooling and adjustment of melt addition rate. The slurry was heated at reflux (68°–72° C.) for one hour, diluted with water, and stirred at 60° C. for 30 minutes. The solid component was collected by filtration and washed with water until acid free. The resultant presscake was reslurried in water. After adjustment of the pH to greater than 7, 7.5 g of 50% sodium hydroxide was added and the resultant slurry was heated at 90° C. for one hour. The slurry was cooled, filtered, and washed with water until alkali free, then reslurried in water. After adjustment of the pH to greater than 9.0–9.5, 3.2 g of a cycloaliphatic carboxylic acid was added. The resultant slurry was heated at about 140°–145° C. for two hours in a closed system (e.g., a pressure reactor), cooled, acidified with phosphoric acid, and stirred. The solid component was collected by filtration and washed with water. The wet cake was dried in an oven at 60° C. to give approximately 54 g of quinacridone as a violet pigment. The quinacridone thus obtained was blended with 0.5 g of N-[3-(N,N-dimethylaminopropyl)] copper phthalocyanine sulfonamide to give a violet pigment.

A water-based paint prepared as described above exhibited a light masstone, yellow tint with reduced chroma, and decreased metallic brightness and blueness compared to paints prepared using the quinacridone of Example 2 according to the invention.

Example 6

Pigmentary quinacridone was prepared according to the invention with the incorporation of about 1% by weight, relative to the quinacridone, of N-[3-(N,N-dimethylaminopropyl)] copper phthalocyanine sulfonamide in the ring-closure reaction and subsequent use of an amine rosin instead of the cycloaliphatic carboxylic acid in the conditioning step.

To 300 g of polyphosphoric acid (117% phosphoric acid) heated at 90° C. was added 0.68 g of N-[3-(N,N-dimethylaminopropyl)] copper phthalocyanine sulfonamide followed by 68.2 g of 2,5-dianilinoterephthalic acid. The mixture was heated at 120°–125° C. for two hours. After the melt was cooled to 90°–95° C., the acid strength was adjusted to 112% by the dropwise addition of phosphoric acid. The resultant melt was stirred for 15 minutes and then slowly poured into 453 g of methanol at 24° C. During the drown, the temperature was allowed to increase to 55° C., with the temperature being controlled by external cooling and adjustment of melt addition rate. The slurry was heated at reflux (68°–72° C.) for one hour, diluted with water, and stirred at 60° C. for 30 minutes. The solid component was collected by filtration and washed with water until acid free. The resultant presscake was reslurried in water. After adjustment of the pH to greater than 7, 7.5 g of 50% sodium hydroxide was added and the resultant slurry was heated at 88° C. for one hour. The slurry was cooled, filtered, and washed with water until alkali free, then reslurried in water. The pH was adjusted to 3–4.5 and 3.3 g of an amine derivative of wood rosin dissolved in water was added. The mixture was stirred for 30 minutes, after which the pH was adjusted to 9.0–9.5. The resultant slurry was heated at about 140°–145° C. for two hours in a closed system. The solid component was collected by filtration and washed with water. The wet cake can be dried or used as is for specific applications. Here, the wet cake was dried in an oven at 60° C. to give approximately 54.0 g of quinacridone as a violet pigment.

An alkyd melamine enamel paint prepared as described above exhibited a much deeper and brighter masstone, bluer tint, and increased metallic blueness and brightness compared to a paint prepared using QUINDO® Violet RV-6911.

A water-based paint prepared as described above exhibited a deeper, brighter masstone and bluer tint compared to a paint prepared using QUINDO® Violet RV-6911.

Example 7

Pigmentary quinacridone was prepared according to the invention with the incorporation of about 1% by weight, relative to the quinacridone, of N-[3-(N,N-dimethylaminopropyl)] copper phthalocyanine sulfonamide in the ring-closure reaction and subsequent dry mixing with a phthalimidomethylquinacridone after the conditioning step.

To 300 g of polyphosphoric acid (117% phosphoric acid) heated at 90° C. was added 0.68 g of N-[3-(N,N-dimethylaminopropyl)] copper phthalocyanine sulfonamide followed by 68.2 g of 2,5-dianilinoterephthalic acid. The mixture was heated at 120°–125° C. for two hours. After the melt was cooled to 90°–95° C., the acid strength was adjusted to 112% by the dropwise addition of phosphoric acid. The resultant melt was stirred for 15 minutes and then slowly poured into 453 g of methanol at 24° C. During the drown, the temperature was allowed to increase to 55° C., with the temperature being controlled by external cooling and adjustment of melt addition rate. The slurry was heated at reflux (68°–72° C.) for one hour, diluted with water, and stirred at 60° C. for 30 minutes. The solid component was collected by filtration and washed with water until acid free. The resultant presscake was reslurried in water. After adjustment of the pH to greater than 7, 7.5 g of 50% sodium hydroxide was added and the resultant slurry was heated at 88° C. for one hour. The slurry was cooled, filtered, and washed with water until alkali free, then reslurried in water. After adjustment of the pH to 9.0–9.5, 3.2 g of a cycloaliphatic carboxylic acid dissolved in alkaline water was added. The resultant slurry was heated at about 140°–145° C. for two hours in a closed system, cooled, acidified with phosphoric acid, and stirred. The solid component was collected by filtration and washed with water. The wet cake was dried in an oven at 60° C. to give approximately 53.0 g of quinacridone as a violet pigment. The quinacridone thus obtained was blended with 5.3 g of phthalimidomethylquinacridone (prepared according to U.S. Pat. No. 3,275,637) to give a violet pigment.

An alkyd melamine enamel paint prepared as described above exhibited a much deeper and brighter masstone, bluer tint with increased chroma, and increased metallic blueness and brightness compared to a paint prepared using QUINDO® Violet RV-6911.

A water-based paint prepared as described above exhibited a deeper masstone, bluer tint, and increased metallic brightness and blueness, as well as a decrease in viscosity, compared to a paint prepared using QUINDO® Violet RV-6911.

Example 8

A pigmentary solid solution of 2,9-dichloroquinacridone and 2,9-dimethoxyquinacridone (weight ratio of about 25:75) was prepared in the presence of 5% N-[3-(N,N-dimethylaminopropyl)] copper phthalocyanine sulfonamide.

To 270 g of polyphosphoric acid (117% phosphoric acid) heated at 85° C. was added 2.5 g of N-[3-(N,N-dimethylaminopropyl)] copper phthalocyanine sulfonamide followed by 13.5 g of 2,9-dichloroquinacridone. The mixture was stirred at 113° C. for 30 minutes, after which 40.5 g of 2,5-di(4-methoxyanilino)terephthalic acid was added. The resultant mixture was heated at 113° C. for five hours. After the melt was cooled to 95° C., the acid strength was adjusted to 113% by the dropwise addition of phosphoric acid. The mixture was slowly poured into 470 g of methanol. The slurry was heated at reflux for two hours, diluted with water and stirred at 60° C. for 30 minutes. The slurry was further diluted with water, after which the solid component was collected by filtration and washed with water until acid free. The resultant presscake was reslurried in water (320 g total water), the pH was adjusted to 8.5 with dilute aqueous sodium hydroxide, and 320 g of methanol was added. The resultant slurry was then heated at 120° C. for six hours in a closed system. After the slurry was cooled to 45°–50° C., 4.8 g of wood rosin (as the sodium salt) was added. After the mixture was stirred for 30 minutes, 10.0 g of CaCl$_2$.2H$_2$O (dissolved in water) was added, the slurry was stirred for one hour, and the pH was acidified (if necessary) with phosphoric acid. The solid component was collected by filtration and washed with water. The wet cake can be dried or used as is for specific applications. Here, the wet cake was dried in an oven at 60° C. to give approximately 48 g of quinacridone as a deep violet pigment.

A water-based paint prepared as described above exhibited a much deeper, brighter masstone, much bluer tint, increased metallic blueness, and reduced viscosity compared to a paint prepared using QUINDO® Violet RV-7051 (available from Bayer Corporation).

Example 9

A pigmentary solid solution of 2,9-dichloroquinacridone and 2,9-dimethoxyquinacridone (weight ratio of about 25:75) was prepared in the presence of 1% N-[3-(N,N-dimethylaminopropyl)] copper phthalocyanine.

To 270 g of polyphosphoric acid (117% phosphoric acid) heated at 85° C. was added 0.54 g of N-[3-(N,N-dimethylaminopropyl)] copper phthalocyanine followed by 13.5 g of 2,9-dichloroquinacridone. The mixture was stirred at 113° C. for 30 minutes, after which 40.5 g of 2,5-di(4-methoxyanilino)terephthalic acid was added. The resultant mixture was heated at 113° C. for five hours. After the melt was cooled to 95° C., the acid strength was adjusted to 113% by the dropwise addition of phosphoric acid. The mixture was slowly poured into 470 g methanol. The slurry was heated at reflux for two hours, diluted with water, and stirred at 60° C. for thirty minutes. The slurry was further diluted with water, after which the solid component was collected by filtration and washed with water until acid free. The presscake was reslurried in water (320 g total water), the pH adjusted to 8.5 with dilute aqueous sodium hydroxide, and 320 g of methanol was added. The resultant slurry was heated at 120° C. for six hours in a closed system (e.g., a pressure reactor). After the slurry was cooled to 45°–50° C., 4.8 g of wood rosin (as the sodium salt) was added. After the mixture was stirred for 30 minutes, 10.0 g of CaCl$_2$.2H$_2$O (dissolved in water) was added, the slurry stirred for one hour, and the pH acidified (if necessary) with phosphoric acid. The solid component was collected by filtration and washed with water. The wet cake can be dried or used as is for specific applications. Here, the wet cake was oven dried at 60° C. to give approximately 48 g of quinacridone as a deep violet pigment.

A water-based paint prepared as described above exhibited a very deep, bright masstone having improved viscosity, much bluer tint, and increased metallic blueness compared to a paint prepared using QUINDO® Violet RV-7051 (available from Bayer Corporation).

Example 10

A pigmentary solid solution of 2,9-dichloroquinacridone and unsubstituted quinacridone (weight ratio of about 80:20) was prepared in the presence of 1% copper phthalocyanine sulfonic acid.

To 350 g of polyphosphoric acid (117% phosphoric acid) heated at 85° C. was added 0.52 g of copper phthalocyanine sulfonic acid followed by 10 g of 2,5-dianilinoterephthalic acid and 40 g of 2,5-di(4-chloroanilino)terephthalic acid. The mixture was heated at 120°–125° C. for three hours. After the melt was cooled to 92° C., the acid strength was adjusted to 112% by the dropwise addition of phosphoric acid. The resultant melt was stirred at 92° C. for 30 minutes and then slowly poured into 657 g of methanol. The slurry was heated at reflux for one hour, cooled to 60° C., diluted with water, collected by filtration, and washed with water until acid free. The resultant presscake was reslurried in water (225 g total water). After adjustment of the pH to 7.0–7.7, 225 g of methanol was added. The resultant slurry was heated at about 120° C. for six hours. The slurry was cooled, filtered, and washed with water. The wet cake can be dried or used as is for specific applications. Here, the wet cake was dried in an oven at 60° C. to give approximately 40 g of a solid solution of 2,9-dichloroquinacridone and unsubstituted quinacridone as a magenta pigment.

A water-based paint prepared as described above exhibited a deeper masstone, bluer tint, and an increased metallic blueness compared to a paint prepared using QUINDO® Magenta RV-6853 (available from Bayer Corporation).

Example 11

Pigmentary 2,9-dichloroquinacridone was prepared according to the invention with the incorporation of 1% by weight, relative to the 2,9-dichloroquinacridone, of N,N-diethylaminopropyl perylenesulfonamide in the ring-closure reaction.

To 300 g of polyphosphoric acid (117% phosphoric acid) heated at 80° C. was added 0.5 g N,N-diethylaminopropyl perylenesulfonamide (prepared according to U.S. Pat. No. 4,310,359) followed by 50 g of 2,5-di(4-chloroanilino) terephthalic acid added over a period of 40 minutes, the temperature being maintained below 110° C. by adjustment of the addition rate. The mixture was heated at 113° C. for 4.5 hours. After the melt was cooled to 92° C., the acid strength was adjusted to 111% by the dropwise addition of phosphoric acid. The resultant melt was slowly poured into 525 g of methanol, the temperature being maintained below 64° C. by external cooling and adjustment of melt addition rate. The slurry was heated at reflux for one hour, cooled to below 60° C., diluted with water, filtered, and washed until acid free. The presscake was dried to obtain 43.8 g of crude dichloroquinacridone, which was then salt ground for three hours using 306 g of a microsized salt and 54.6 g of a glycol. The salt was extracted using a slightly alkaline water slurry at 65° C. for one hour. After the slurry was filtered, the presscake was reslurried in slightly acidic water and held at 65° C. for one hour. The solid component was collected by filtration and washed with water. The wet cake can be dried or used as is for specific applications. Here, the wet cake was dried in an oven at 60° C. to give approximately 43 g of 2,9-dichloroquinacridone as a magenta pigment.

A water-based paint prepared as described above exhibited a very deep, very bright masstone with improved transparency compared to a paint prepared using QUINDO® Magenta RV-6843 (available from Bayer Corporation).

Example 12

Pigmentary 2,9-dichloroquinacridone was prepared according to the invention with the incorporation of 5% by weight, relative to the 2,9-dichloroquinacridone, of N,N-diethylaminopropyl perylenesulfonamide in the ring-closure reaction.

To 300 g of polyphosphoric acid (117% phosphoric acid) heated at 80° C. was added 2.5 g N,N-diethylaminopropyl perylenesulfonamide followed by 50 g of 2,5-di(4-chloroanilino)terephthalic acid added over a period of 40 minutes, the temperature being maintained below 110° C. by adjustment of the addition rate. The mixture was heated at 113° C. for 4.5 hours. After the melt was cooled to 98° C., the acid strength was adjusted to 111% by the dropwise addition of phosphoric acid. The resultant melt was slowly poured into 525 g of methanol, the temperature being maintained below 64° C. by external cooling and adjustment of melt addition rate. The slurry was heated at reflux for one hour, cooled to below 60° C., diluted with water, filtered, and washed until acid free. The presscake was dried to obtain 44.1 g of crude dichloroquinacridone, which was then salt ground for three hours using 306 g of a microsized salt and 57.9 g of a glycol. The salt was extracted using a slightly alkaline water slurry at 65° C. for one hour. After the slurry was filtered, the presscake was reslurried in slightly acidic water and held at 65° C. for one hour. The solid component was collected by filtration and washed with water. The wet cake can be dried or used as is for specific applications. Here, the wet cake was dried in an oven at 60° C. to give approximately 43 g of 2,9-dichloroquinacridone as a magenta pigment.

A water-based paint prepared as described above exhibited an extremely deep masstone with improved transparency compared to a paint prepared using QUINDO® Magenta RV-6843.

Example 13

Pigmentary 2,9-dichloroquinacridone was prepared according to the invention with the incorporation of 10% by weight, relative to the 2,9-dichloroquinacridone, of N,N-diethylaminopropyl perylenesulfonamide in the ring-closure reaction.

To 300 g of polyphosphoric acid (117% phosphoric acid) heated at 80° C. was added 5 g N,N-diethylaminopropyl perylenesulfonamide followed by 50 g of 2,5-di(4-chloroanilino)terephthalic acid added over a period of 40 minutes, the temperature being maintained below 110° C. by adjustment of the addition rate. The mixture was heated at 113° C. for 4.5 hours. After the melt was cooled to 97° C., the acid strength was adjusted to 111% by the dropwise addition of phosphoric acid. The resultant melt was slowly poured into 525 g of methanol, the temperature being maintained below 64° C. by external cooling and adjustment of melt addition rate. The slurry was heated at reflux for one hour, cooled to below 60° C., diluted with water, filtered, and washed until acid free. The presscake was dried to obtain 44.1 g of crude dichloroquinacridone, which was then salt ground for three hours using 306 g of a microsized salt and 54.9 g of a glycol. The salt was extracted using a slightly alkaline water slurry at 65° C. for one hour. After the slurry was filtered, the presscake was reslurried in slightly acidic water and held at 65° C. for one hour. The solid component was collected by filtration and washed with water. The wet cake can be dried or used as is for specific applications. Here, the wet cake was dried in an oven at 60° C. to give approximately 44 g of 2,9-dichloroquinacridone as a magenta pigment.

A water-based paint prepared as described above exhibited an extremely deep masstone with improved transparency compared to a paint prepared using QUINDO® Magenta RV-6843.

Example 14

Pigmentary 2,9-dimethylquinacridone was prepared according to the invention with the incorporation of 0.1% by weight, relative to the 2,9-dimethylquinacridone, of N-[3-(N,N-dimethylaminopropyl)] copper phthalocyanine sulfonamide in the ring-closure reaction.

To 300 g of polyphosphoric acid (112% phosphoric acid) heated at 88° C. was added 0.07 g of N-[3-(N,N-dimethylaminopropyl)] copper phthalocyanine sulfonamide followed by 68.2 g of 2,5-di(4-methylanilino)terephthalic acid added over a period of 35 minutes, the temperature being maintained below 120° C. by adjustment of the addition rate. The mixture was heated at 123° C. for two hours. After the melt was cooled to 93° C., it was slowly poured into 500 g of methanol, the temperature being maintained below 64° C. by external cooling and adjustment of melt addition rate. The slurry was heated at reflux for one hour, cooled to below 60° C., diluted with water, filtered, and washed until acid free. The resultant presscake was reslurried in water. After adjustment of the pH to greater than 7, 5.5 g of 50% sodium hydroxide was added and the resultant slurry was heated at 90° C. for one hour. The slurry was cooled, filtered, and washed with water until alkali free, then reslurried in water. After adjustment of the pH to 9.5, the slurry was heated at 143° C. for two hours in a closed system (e.g., a pressure reactor), and cooled to 40° C. After the slurry was acidified to pH 3.3, an emulsion of 2.2 g of an anionic surfactant, 30 g of a petroleum distillate, and 80 g of water was added, and the slurry was stirred for three hours. The solid component was collected by filtration and washed with water. The wet cake was dried in an oven at 60° C. to give approximately 53 g of 2,9-dimethylquinacridone as a magenta pigment.

A water-based paint prepared as described above exhibited a deeper and brighter masstone compared to QUINDO® Magenta RV-6832 (available from Bayer Corporation).

Example 15

Pigmentary quinacridone was prepared according to the invention with the incorporation of about 1% by weight, relative to the quinacridone, of copper phthalocyanine in the ring-closure reaction.

To 300 g of polyphosphoric acid (117% phosphoric acid) heated at 90° C. was added 0.7 g of copper phthalocyanine followed by 68.2 g of 2,5-dianilinoterephthalic acid. The mixture was heated at 120°–125° C. for two hours. After the melt was cooled to 95° C., the acid strength was adjusted to 112% by the dropwise addition of phosphoric acid. The resultant melt was stirred for 15 minutes and then slowly poured into 453 g of methanol at 24° C. During the drown, the temperature was allowed to increase to 55° C., with the temperature being controlled by external cooling and adjustment of melt addition rate. The slurry was heated at reflux (68°–72° C.) for one hour, diluted with water, and stirred at 60° C. for 30 minutes. The solid component was collected by filtration and washed with water until acid free. The resultant presscake was reslurried in water. After adjustment of the pH to greater than 7, 7.5 g of 50% sodium hydroxide was added and the resultant slurry was heated at 90° C. for one hour. The slurry was cooled, filtered, and washed with water until alkali free, then reslurried in water. After adjustment of the pH to greater than 8.5, 3.2 g of a cycloaliphatic carboxylic acid was added. The resultant slurry was heated at about 140°–145° C. for two hours in a closed system, cooled, acidified with phosphoric acid, and stirred. The solid component was collected by filtration and washed with water. The wet cake can be dried or used as is for specific applications. Here, the wet cake was dried in an oven at 60° C. to give approximately 54.0 g of quinacridone as a brilliant violet pigment.

A water-based paint prepared as described above exhibited deeper masstone, bluer tint, and increased metallic brightness and blueness compared to a paint prepared using QUINDO® Violet RV-6911.

Example 16 (Comparison)

Quinacridone was prepared in the absence of a pigment additive of the invention exactly as described in comparison Example 5 except that the quinacridone was dry mixed with 1% copper phthalocyanine instead of N-[3-(N,N-dimethylaminopropyl)] copper phthalocyanine sulfonamide.

The untreated quinacridone (54 g) was blended with 0.5 g of copper phthalocyanine to give a violet pigment.

A water-based paint prepared as described above exhibited a light masstone, decreased chroma, and decreased metallic brightness compared to paints prepared using the pigmentary quinacridone prepared according to Example 15 of the invention.

Example 17

Pigmentary quinacridone was prepared according to the invention with the incorporation of about 0.25% by weight, relative to the quinacridone, of Carbazole Violet (a dioxazine pigment also known as Pigment Violet 23) in the ring-closure reaction.

To 240 g of polyphosphoric acid (116% phosphoric acid) heated at 85° C. was added 0.15 g of Carbazole Violet followed by 60 g of 2,5-dianilinoterephthalic acid. The mixture was heated at 120°–125° C. for two hours. After the melt was cooled to 95° C., the acid strength was adjusted to 110% by the dropwise addition of phosphoric acid. The resultant melt was stirred for 15 minutes and then slowly poured into 400 g of methanol at 24° C. During the drown, the temperature was allowed to increase to 60° C., with the temperature being controlled by external cooling and adjustment of melt addition rate. The slurry was heated at reflux (68°–72° C.) for one hour, diluted with water, and stirred at 60° C. for 30 minutes. The solid component was collected by filtration and washed with water until acid free. The resultant presscake was reslurried in water. After adjustment of the pH to greater than 7, 5 g of 50% sodium hydroxide was added and the resultant slurry was heated at 90° C. for two hours. The slurry was cooled, filtered, and washed with water until alkali free, then reslurried in water. After adjustment of the pH to greater than 9.0–9.5, 3.2 g of a cycloaliphatic carboxylic acid was added. The resultant slurry was heated at about 140°–145° C. for four hours in a closed system, cooled to less than 45° C., acidified with phosphoric acid, and stirred. The solid component was collected by filtration and washed with water. The wet cake can be dried or used as is for specific applications. Here, the wet cake was dried in an oven at 60° C. to give approximately 50 g of quinacridone as a violet pigment.

A water-based paint prepared as described above exhibited a deep, transparent masstone, increased chroma in the undertone, and increased metallic brightness compared to QUINDO® Violet RV-6911.

Example 18

Pigmentary quinacridone was prepared exactly as described in Example 17 of the invention except that 0.5% by weight, relative to the quinacridone, of Carbazole Violet was used in the ring-closure reaction. Quinacridone (50 g) was obtained as a violet pigment.

A water-based paint prepared as described above exhibited a deep, transparent masstone, increased chroma in the undertone, and increased metallic brightness compared to QUINDO® Violet RV-6911.

Example 19 (Comparison)

Quinacridone was prepared exactly as described in Example 18 except that Carbazole Violet was omitted from the ring-closure reaction but was instead added by dry mixing after chemical synthesis of the quinacridone. The untreated quinacridone (50 g) was blended with 0.5 g of Carbazole Violet to give a violet pigment.

A rubout test was used for evaluation of color and appearance of the pigments of Examples 18 and 19. Dispersions were prepared on a Hoover Automatic Muller Model M4 (Hoover Color Corporation, Hiwassee, Va.) fitted with two glass plates and one 50-lb (ca. 22.5-kg) weight. For the masstone dispersion, 200 mg of dry pigment was added to 240 mg of raw linseed oil (distributed by United Specialties of America, Orlando, Fla.) and the mixture was placed on the bottom plate of the muller. After the upper plate was placed in contact with the lower plate, the bottom plate was allowed to turn for 50 revolutions. After the plates were separated, the paste on the upper plate was removed with a spatula and added to the bottom plate. This dispersion process was repeated three more times. The resultant paste was diluted with 480 mg of raw linseed oil and the muller dispersion process was repeated two times. A small amount of the resultant masstone dispersion was placed on a slide and evaluated in comparison with a comparison dispersion prepared by the same muller dispersion process.

The rubout test also included an undertone (tint) evaluation using 100 mg of the (final) masstone dispersion and 2.0 g of Zinc Oxide Bleach White W-3689 (Superior Printing Inks, New York, N.Y.). This mixing process was carried out using a spatula. The undertone was also compared to the comparison undertone dispersion.

Based on the rub-out test, the pigment of comparison Example 19 exhibited a lighter masstone and decreased chroma in the undertone compared to the pigment of Example 18 of the invention.

What is claimed is:

1. A process for the preparation of quinacridone pigments comprising
   (a) heating, at a temperature of 80° C. to 145° C., a reaction mixture comprising
      (i) 2,5-dianilinoterephthalic acid, a 2,5-dianilino-3,6-dihydroterephthalic acid ester, a derivative of 2,5-dianilinoterephthalic acid or a 2,5-dianilino-3,6-dihydroterephthalic acid ester having one or more substituents in at least one aniline ring, or a mixture thereof,
      (ii) 3 to 15 parts by weight, per part of component (a)(i), of a dehydrating agent, and
      (iii) 0.1 to 15 percent by weight, based on component (a)(i), of one or more non-quinacridone pigments, with the proviso that if component (a)(i) is a 2,5-dianilino-3,6-dihydroterephthalic acid ester or a derivative thereof, reaction step (a) additionally comprises an oxidation step;
   (b) drowning the reaction mixture from step (a) by adding said reaction mixture to 3 to 15 parts by weight, per part of component (a)(i), of a liquid in which the quinacridone pigment is substantially insoluble;
   (c) isolating the quinacridone pigment;
   (d) optionally, conditioning the quinacridone pigment; and
   (e) optionally, blending the quinacridone pigment with one or more quinacridone derivatives.

2. A process according to claim 1 wherein component (a)(i) is selected from the group consisting of 2,5-dianilinoterephthalic acid, 2,5-di(4-methylanilino) terephthalic acid, 2,5-di(4-methoxyanilino)terephthalic acid, 2,5-di(4-chloroanilino)terephthalic acid, and mixtures thereof.

3. A process according to claim 1 wherein the reaction mixture is heated in step (a) at a temperature of 100° C. to 130° C.

4. A process according to claim 1 wherein the dehydrating agent (a)(ii) is polyphosphoric acid.

5. A process according to claim 4 wherein 3 to 10 parts by weight, relative to component (a)(i), of polyphosphoric acid is used.

6. A process according to claim 1 wherein pigment (a)(iii) is a non-quinacridone pigment having the formula

wherein

Q represents a non-quinacridone pigment moiety;

A represents an —O—, —S—, —NR$^a$—, —SO$_2$—, —CO—, —Alk—, or —Ar— bridging group, a chemically reasonable combination of such bridging groups, or a direct bond between Q and Y;

Y represents hydrogen, $C_1$–$C_{12}$ alkyl, $C_2$–$C_{12}$ alkenyl, $C_5$–$C_7$ cycloalkyl, $C_5$–$C_7$ cycloalkenyl, $C_6$–$C_{10}$ aryl, heteroaryl having five or six ring atoms in which at least one such ring atom is N, O, S, or a combination thereof, $C_7$–$C_{16}$ aralkyl, OR$^b$, or —NR$^c$R$^d$, or halogen;

—Alk— is $C_1$–$C_8$ alkylene, substituted $C_1$–$C_8$ alkylene, $C_5$–$C_7$ cycloalkylene, or substituted $C_5$–$C_7$ cycloalkylene;

—Ar— is $C_6$–$C_{10}$ arylene or substituted $C_6$–$C_{10}$ arylene;

R$^a$ is hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl;

R$^b$ is hydrogen, metal, or $C_1$–$C_{12}$ alkyl;

R$^c$ and R$^d$ are independently hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl, or R$^c$ and R$^d$ together are $C_4$–$C_6$ alkylene or are aliphatic or aromatic dicarbonyl groups, and wherein R$^c$ and R$^d$ optionally can further contain heteroatoms such as N, O, or S and optionally can further be substituted with $C_1$–$C_{12}$ alkyl, $C_1$–$C_{12}$ alkoxy, $C_2$–$C_{12}$ alkenyl, $C_5$–$C_7$ cycloalkyl, $C_5$–$C_7$ cycloalkenyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, —OH, halogen, —CN, carboxyl, —CO—NR$^c$R$^d$, or —SO$_2$—NR$^c$R$^d$; and n is from 0.01 to 4.

7. A process according to claim 1 wherein non-quinacridone pigment (a)(iii) is a phthalocyanine, dioxazine, perylene, 1,4-diketopyrrolopyrrole, anthrapyrimidine, anthanthrone, flavanthrone, indanthrone, isoindoline, isoindolinone, perinone, pyranthrone, thioindigo, 4,4'-diamino-1,1'-dianthraquinonyl, or an azo pigment or a derivative thereof having one or more halogen, $C_1$–$C_6$ alkyl, or $C_1$–$C_6$ alkoxy substituents.

8. A process according to claim 1 wherein non-quinacridone pigment (a)(iii) is a copper phthalocyanine, perylene, or dioxazine pigment or a derivative thereof substituted with one or more halogen, $C_1$–$C_6$ alkyl, or $C_1$–$C_6$ alkoxy.

9. A process according to claim 1 wherein pigment (a)(iii) is a non-quinacridone pigment having the formula

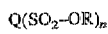
$$Q(SO_2\text{—}OR)_n$$

wherein

Q represents a non-quinacridone pigment moiety;

R is hydrogen or a metal; and n is from 0.01 to 4.

10. A process according to claim 1 wherein pigment (a)(iii) is a copper phthalocyanine derivative having the formula

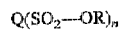
$$Q(SO_2\text{—}OR)_n$$

wherein

Q represents copper phthalocyanine or copper phthalocyanine substituted with one or more halogen, $C_1$–$C_6$ alkyl, or $C_1$–$C_6$ alkoxy;

R is hydrogen or a metal; and n is from 0.2 to 1.

11. A process according to claim 1 wherein pigment (a)(iii) is a non-quinacridone pigment having the formula

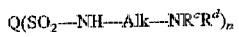
$$Q(SO_2\text{—}NH\text{—}Alk\text{—}NR^cR^d)_n$$

wherein

Q represents a non-quinacridone pigment moiety;

Alk represents $C_1$–$C_8$ alkylene or $C_5$–$C_7$ cycloalkylene;

$R^c$ and $R^d$ are independently hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl, or $R^c$ and $R^d$ together are $C_4$–$C_6$ alkylene; and n is from 0.01 to 4.

12. A process according to claim 1 wherein pigment (a)(iii) is a copper phthalocyanine or perylene derivative having the formula

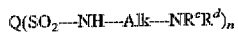
$$Q(SO_2\text{—}NH\text{—}Alk\text{—}NR^cR^d)_n$$

wherein

Q represents a copper phthalocyanine or perylene moiety;

Alk represents $C_1$–$C_8$ alkylene;

$R^c$ and $R^d$ are independently hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl, or $R^c$ and $R^d$ together are $C_4$–$C_6$ alkylene; and n is from 0.2 to 1.

13. A process according to claim 1 wherein the reaction mixture from step (a) is drowned by adding said reaction mixture to water, a lower aliphatic alcohol, or a mixture thereof.

14. A process according to claim 1 wherein the reaction mixture from step (a) is drowned by adding said reaction mixture to methanol.

15. A quinacridone pigment prepared by the process according to claim 1.

* * * * *